(12) United States Patent
Long

(10) Patent No.: US 12,389,828 B2
(45) Date of Patent: Aug. 19, 2025

(54) SYSTEM AND METHOD FOR AN AGRICULTURAL APPLICATOR

(71) Applicant: CNH Industrial America LLC, New Holland, PA (US)

(72) Inventor: Scott Allen Long, Plainfield, IL (US)

(73) Assignee: CNH Industrial America LLC, New Holland, PA (US)

( * ) Notice: Subject to any disclaimer, the term of this patent is extended or adjusted under 35 U.S.C. 154(b) by 865 days.

(21) Appl. No.: 17/544,484

(22) Filed: Dec. 7, 2021

(65) Prior Publication Data

US 2023/0172108 A1 Jun. 8, 2023

(51) Int. Cl.
*A01D 43/14* (2006.01)
*A01D 41/127* (2006.01)
*A01M 7/00* (2006.01)

(52) U.S. Cl.
CPC ........... *A01D 43/14* (2013.01); *A01D 41/127* (2013.01); *A01M 7/0089* (2013.01)

(58) Field of Classification Search
CPC .... A01D 43/14; A01D 41/127; A01M 7/0089
See application file for complete search history.

(56) References Cited

U.S. PATENT DOCUMENTS

| | | | | |
|---|---|---|---|---|
| 2020/0337235 | A1* | 10/2020 | Blank | A01M 21/043 |
| 2021/0243950 | A1* | 8/2021 | Blank | A01M 21/02 |
| 2022/0132723 | A1* | 5/2022 | Anderson | G01C 21/20 |
| | | | | 701/25 |
| 2022/0192174 | A1* | 6/2022 | Humpal | A01M 7/0042 |
| 2022/0327815 | A1* | 10/2022 | Picon Ruiz | G06T 7/001 |
| 2024/0000002 | A1* | 1/2024 | Kiepe | A01M 7/0096 |

* cited by examiner

*Primary Examiner* — James J Lee
*Assistant Examiner* — Andrew Sang Kim
(74) *Attorney, Agent, or Firm* — Dority & Manning, P.A.

(57) ABSTRACT

A system for an agricultural operation includes a harvester configured to separate crop material into a harvest material and a non-harvest material. A crop material sensor is operably coupled with the harvester and is configured to capture crop material data. A positioning device is configured to generate location data to geolocate the crop material data relative to a field. A computing system is communicatively coupled with the crop material sensor and the positioning device. The computing system is configured to classify objects within the crop material data as harvest material or non-harvest material generate a map based on the harvest material and the non-harvest material.

19 Claims, 13 Drawing Sheets

SYSTEM AND METHOD FOR AN AGRICULTURAL APPLICATOR

FIELD

The present disclosure generally relates to agricultural vehicles for performing operations within a field.

BACKGROUND

Agricultural vehicles perform various operations within a field. For example, an agricultural harvesters to harvest and process crops while agricultural applicators (e.g., a sprayer) apply an agricultural product (e.g., a pesticide, a nutrient, and/or the like) onto crops and/or a ground surface as the applicator is traveling across a field. To facilitate such travel, the agricultural vehicles can be configured as self-propelled vehicles or implements towed behind an agricultural tractor or another suitable work vehicle.

While each vehicle performs a defined operation, various information may be generated. Accordingly, an improved system and method for utilizing such information for subsequent operations would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a system for an agricultural operation that includes a harvester configured to separate crop material into a harvest material and a non-harvest material. A crop material sensor is operably coupled with the harvester and configured to capture crop material data. A positioning device is configured to generate location data to geolocate the crop material data relative to a field. A computing system is communicatively coupled with the crop material sensor and the positioning device. The computing system is configured to classify objects within the crop material data as harvest material or non-harvest material and generate a map based on the harvest material and the non-harvest material.

In some aspects, the present subject matter is directed to a method for operating an agricultural system. The method includes capturing, from a crop material sensor, crop material data while processing crop material through a harvester. The method also includes classifying objects within the crop material data as harvest material or non-harvest material. In addition, the method includes generating a map based on the harvest material and the non-harvest material.

In some aspects, the present subject matter is directed to an agricultural system that includes a harvester configured to separate crop material into a harvest material and a non-harvest material including a crop material sensor configured to capture crop material data of the crop material. A sprayer is communicatively coupled with the harvester and is configured to selectively apply an agricultural product to a field based at least in part on the crop material data.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
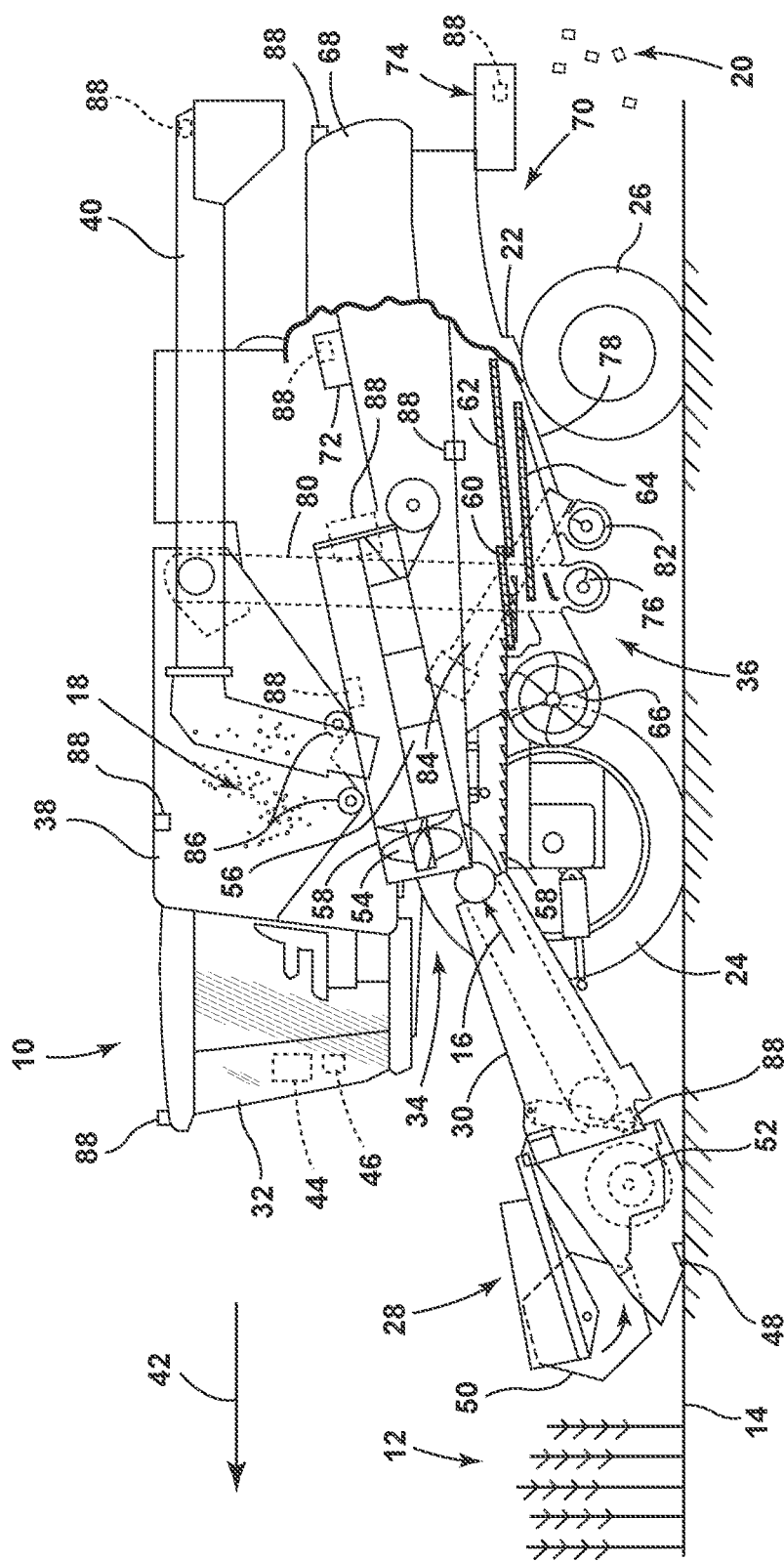
FIG. 1 illustrates a side view of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a system for various agricultural operations. In some instances, a first vehicle, such as a harvester, is configured to perform a first agricultural operation within a field. While the first vehicle described below are generally illustrated and described as a harvester, the first vehicle may additionally or alternatively be configured as a tractor, a self-propelled windrower, a self-propelled sprayer, and/or the like. As such, in various examples, the first vehicle may be configured to perform at least one of a planting process, seeding process, a tilling process, a mapping process, a scouting process, a harvesting process, and/or any other process during the operation of the first vehicle. In addition, the first vehicle may be human-controlled, autonomously controlled, and/or semi-autonomously controlled without departing from the teachings provided herein.

When the first vehicle is a harvester, the harvester is configured to separate crop material into a harvest material and a non-harvest material. A crop material sensor is operably coupled with the harvester and configured to capture crop material data. In addition, a positioning device is configured to generate location data to geolocate the crop material data relative to a field A computing system is communicatively coupled with the crop material sensor and the positioning device. The computing system is configured to generate field data based on the crop material data and the location data. For example, the field data may include identified objects within the crop material data, which may include identifying the objects as harvest material or non-harvest material. In turn, the computing system may generate a map based on the harvest material and the non-harvest material. The map may be in the form of a harvest material yield map, a projected weed concentration map, and/or a prescription map.

In addition, a second vehicle, such as a sprayer, may receive the field data, the crop material data, and/or the location data from the first vehicle. In turn, the sprayer may apply an agricultural product to the field based at least in part on the data. By utilizing the data from the first vehicle, a more effective application of agricultural product to the field may be accomplished.

Referring now to FIG. 1, a first vehicle configured as an agricultural harvester 10 in the form of a combine is illustrated. In general, the harvester 10 is configured to sever crops 12 from a field 14 and direct the crop material 16 into the harvester 10. Within the harvester 10, the crop material 16 may be separated into harvest material 18 (e.g., grain) and non-harvest material 20 (e.g., material other than grain (MOG), straw, previously harvested crop, etc.). The harvest material 18 may be stored within the harvester 10 and/or directed into a storage space, such as a storage cart. The non-harvested crop may be exhausted from the harvester 10 back into the field 14.

As illustrated, the harvester 10 includes a chassis 22, ground engaging wheels 24 and 26, a header 28, a feeder housing 30, an operator cab 32, a threshing and separation system 34, a cleaning system 36, a grain tank 38, and an unloading conveyance 40. The wheels 14, 16 may be configured to support the harvester 10 relative to the field 14 (or another ground surface) and move the agricultural harvester 10 in a direction of forward travel 42 across a field 14.

The cab 32, or any other form of operator's station, may house various control or input devices (e.g., levers, pedals, control panels, buttons, and/or the like) for permitting an operator to control the operation of the harvester 10. For instance, as shown in FIG. 1, the agricultural harvester 10 may include a user interface 44, such as a human-vehicle interface (HMI), for providing messages and/or alerts to the operator and/or for allowing the operator to interface with the vehicle's controller through one or more user-input devices 46 (e.g., levers, pedals, control panels, buttons, and/or the like) within the cab 32 and/or in any other practicable location.

The header 28 can be mounted to the front portion of harvester 10 and can include a cutter bar 48 for severing crops 12 from a field 14 during forward motion of harvester 10. A rotatable reel 50 feeds the crop into the header 28, and a double auger 52 feeds the severed crop material 16 inwardly from each side toward the feeder housing 30. The feeder housing 30 feeds the cut crop material 16 to the threshing and separation system 34.

The threshing and separation system 34 is configured to thresh and separate a flow of the crop material 16 that flows to the threshing and separation system 34 from the feeder housing 30. The threshing and separation system 34 generally includes a threshing rotor 54 at least partially enclosed by a rotor cage and rotatable within a corresponding perforated concave 56. The crop material 16 are threshed and separated by the rotation of rotor 54 within the concave 56, and larger non-harvest material 20, such as material other than grain, stalks, leaves, and the like are discharged from the rear of harvester 10. Smaller elements of the crop material 16 including the harvest material 18 and non-harvest material 20, including particles lighter than grain, such as chaff, dust, and straw, are discharged through perforations of the concave 56. The threshing and separation system 34 can also be a different type of system, such as a system with a transverse rotor rather than an axial rotor, etc.

The harvest material 18 that has been separated by the threshing and separation system 34 falls onto a grain pan 58 and is conveyed toward the cleaning system 36. The cleaning system 36 may include an optional pre-cleaning sieve 60, an upper sieve 62 (also known as a chaffer sieve or sieve assembly), a lower sieve 64 (also known as a cleaning sieve), and a cleaning fan 66. The crop material 16 on the sieves 60, 62, and 64 is subjected to a cleaning action by the fan 66, which provides airflow through the sieves 60, 62, and 64 to remove chaff and other impurities such as dust from the harvest material 18 by making this material airborne for discharge from a straw hood 68 of a residue management system 70 of the harvester 10. Optionally, the chaff and/or straw can proceed through a chopper 72 to be further processed into even smaller particles before discharging out of the harvester 10 by a spreader assembly 74. It should be appreciated that the "chopper" 180 referenced herein, which may include knives, may also be what is typically referred to as a "beater", which may include flails or other construction and that the term "chopper" as used herein refers to any construction which can reduce the particle size of the entering crop material 16 by various actions including chopping, flailing, etc. The grain pan 58 and the pre-cleaning sieve 60 oscillate in a fore-to-aft manner to transport the grain and finer non-harvest material 20 to the upper surface of the upper sieve 62. The upper sieve 62 and the lower sieve 64 are vertically arranged relative to each other, and likewise oscillate in a fore-to-aft manner to spread the harvest material 18 across the sieves 62, 64, while permitting the passage of cleaned harvest material 18 by gravity through the openings of the sieves 62, 64.

Clean harvest material 18 falls to a clean grain auger 76 positioned crosswise below and toward the front of the lower sieve 64. The clean grain auger 76 receives clean harvest material 18 from each sieve 62, 64, and a bottom pan 78 of the cleaning system 36. The clean grain auger 76 conveys the clean harvest material 18 laterally to a grain elevator 80 for transport to the grain tank 38. Tailings from the cleaning system 36 falls to a tailings auger trough 82. The tailings are transported via a return auger 84 to the upstream end of the cleaning system 36 for repeated cleaning action. A pair of grain tank augers 86 within the grain tank 38 convey the clean grain laterally within the grain tank 38 to the unloader 160 for discharge from the harvester 10.

In various examples, the harvester 10 may further include one or more crop material sensors 88 that may be configured to capture data indicative of the crop material 16. For instance, the crop material sensors 88 may be configured to capture data indicative of an amount or volume of the harvest material 18 and/or an amount or volume of the non-harvest material 20. In several embodiments, the crop material sensors 88 may be installed or otherwise positioned on or within any component of the harvester 10. For instance, the one or more crop material sensors 88 may be installed on an exterior portion of the harvester 10 and configured to capture data forwardly, rearwardly, and/or laterally outward of the harvester 10. Additionally or alternatively, the one or more crop material sensors 88 may be installed within the vehicle. For example, the one or more crop material sensors 88 may be operably coupled with the feeder housing 30, the threshing and separation system 34, the cleaning system 36, the grain tank 38, the unloading conveyance 40, the residue management system 70, the chopper 72, the spreader assembly 74, and/or any other system of the harvester 10.

In various embodiments, the one or more crop material sensors 88 are object detecting/identifying imaging devices, where the data captured by the one or more crop material sensors 88 may be indicative of the type of plants (e.g., harvest material 18 and/or non-harvest material 20) and/or other objects.

The agricultural harvester 10 may include any suitable number of the crop material sensors 88 and should not be construed as being limited to the number of crop material sensors 88 shown in FIG. 1. Additionally, the crop material sensors 88 may generally correspond to any suitable sensing devices. For example, each crop material sensor 88 may correspond to any suitable camera, such as single-spectrum camera or a multi-spectrum camera configured to capture images, for example, in the visible light range and/or infrared spectral range. Additionally, in various embodiments, the camera may correspond to a single lens camera configured to capture two-dimensional images or a stereo camera having two or more lenses with a separate image imaging device for each lens to allow the camera to capture stereographic or three-dimensional images. Alternatively, the crop material sensors 88 may correspond to any other suitable image capture devices and/or other imaging devices capable of capturing "images" or other image-like data. For example, the crop material sensors 88 may correspond to or include radio detection and ranging (RADAR) sensors, light detection and ranging (LIDAR) sensors, and/or any other practicable device.

Figure 2:
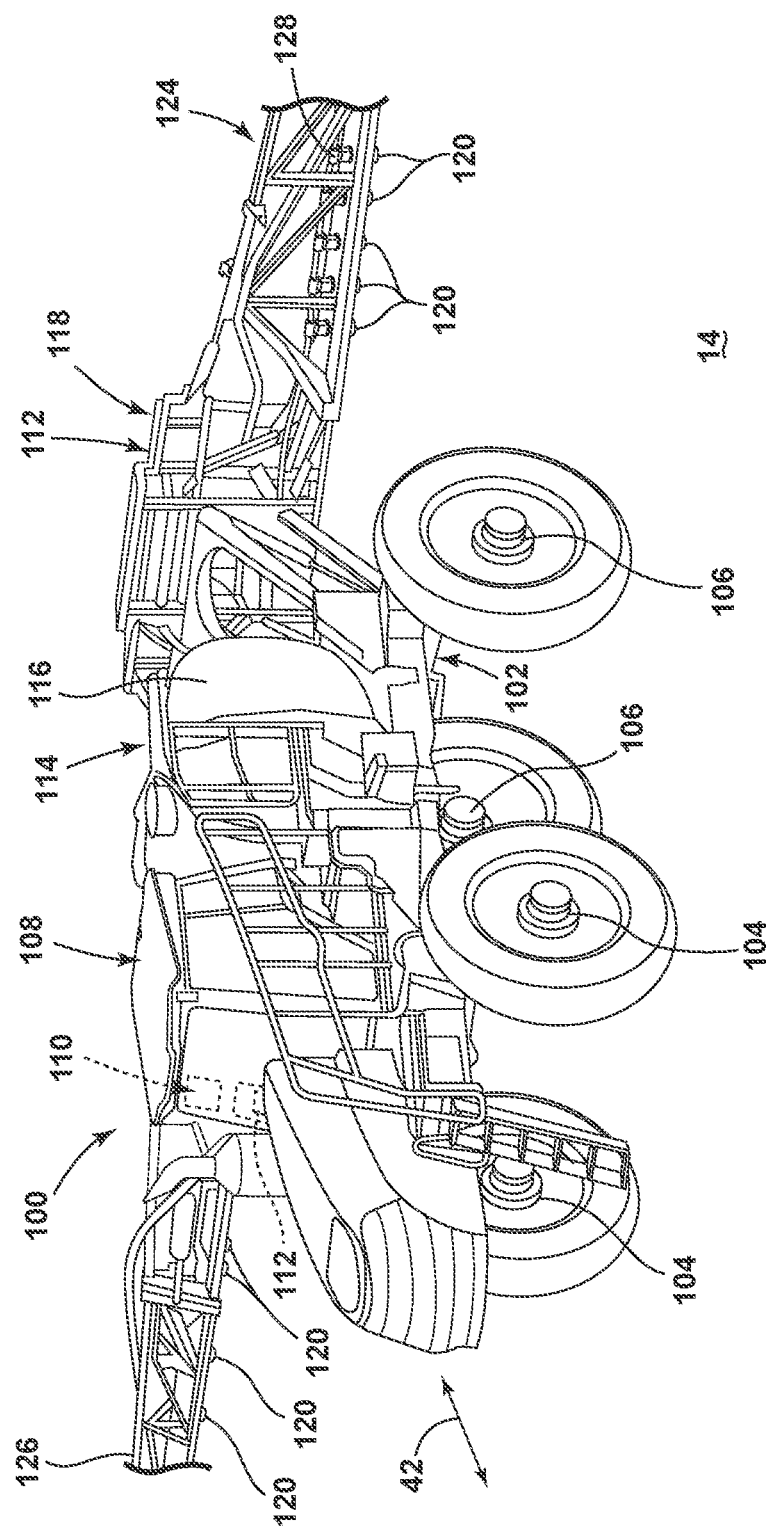
FIG. 2 illustrates a perspective view of an agricultural sprayer in accordance with aspects of the present subject matter.

Referring to FIG. 2, a second vehicle configured as an agricultural sprayer 100 capable of performing a spraying operation based at least partially on the data provided from the first vehicle and/or the one or more crop material sensors 88 (FIG. 1) is generally illustrated. In some embodiments, such as the one illustrated in FIG. 2, the agricultural sprayer 100 may include a chassis 102 configured to support or couple to a plurality of components. For example, front and rear wheels 104, 106 may be coupled to the chassis 102. The wheels 104, 106 may be configured to support the work vehicle 10 relative to the field 14 and move the work vehicle 10 in a direction of travel (e.g., as indicated by arrow 42 in FIG. 2) across a field 14 or a ground surface.

The chassis 102 may also support a cab 108, or any other form of operator's station, that houses various control or input devices (e.g., levers, pedals, control panels, buttons, and/or the like) for permitting an operator to control the operation of the sprayer 100. For instance, as shown in FIG. 2, the agricultural sprayer 100 may include a user interface 110, such as a human-vehicle interface (HMI), for providing messages and/or alerts to the operator and/or for allowing the operator to interface with the vehicle's controller through one or more user-input devices 112 (e.g., levers, pedals, control panels, buttons, and/or the like) within the cab 108 and/or in any other practicable location.

The chassis 102 may also support a product system 112. The product system 112 can include one or more tanks 116, such as a product tank and/or a rinse tank, and a boom assembly 118. The product tank is generally configured to store or hold an agricultural product, such as pesticides (e.g., herbicides, insecticides, rodenticides, etc.) and/or nutrients. The agricultural product is conveyed from the product tank and/or the rinse tank through a product circuit including numerous plumbing components, such as interconnected pieces of tubing, for release onto the underlying field 14 (e.g., plants and/or soil) through one or more nozzle assemblies 120 mounted on the boom assembly 118 (or the sprayer 100).

As shown in FIG. 2, the boom assembly 118 can include a frame 122 that supports first and second boom arms 124, 126, which may be orientated in a cantilevered nature. The first and second boom arms 124, 126 are generally movable between an operative or unfolded position and an inoperative or folded position. When distributing an agricultural product, the first and/or second boom arm 124, 126 extend laterally outward from the work vehicle 10 to cover wide swaths of the underlying ground surface, as illustrated in FIG. 2. However, to facilitate transport, each boom arm 124, 126 of the boom assembly 118 may be independently folded forwardly or rearwardly into the inoperative position, thereby reducing the overall width of the vehicle 10, or in some examples, the overall width of a towable implement when the applicator is configured to be towed behind the work vehicle 10.

The boom assembly 118 may be configured to support a plurality of nozzles 230. Each nozzle 230 may, in turn, be configured to dispense the agricultural product stored within the tank 26 onto the underlying field 14. In several embodiments, the nozzles 230 may be mounted on and/or coupled to the first and/or second boom arms 124, 126 of the boom assembly 118, with the nozzles 230 being spaced apart from each other along a lateral direction 44. Furthermore, fluid conduits 128 may fluidly couple the nozzles 230 to the tanks. In this respect, as the sprayer 100 travels across the field 14 in the direction of travel 42 to perform a spraying operation thereon, the agricultural product moves from the tank 26 through the fluid conduit(s) 58 to each of the nozzles 230.

The nozzles 230 may, in turn, dispense or otherwise spray a fan of the agricultural product. For example, in one embodiment, the nozzles 230 may correspond to flat fan nozzles configured to dispense a flat fan of the agricultural product. However, in alternative embodiments, the nozzles 230 may correspond to any other suitable types of nozzles, such as dual pattern nozzles and/or hollow cone nozzles.

Figure 3:
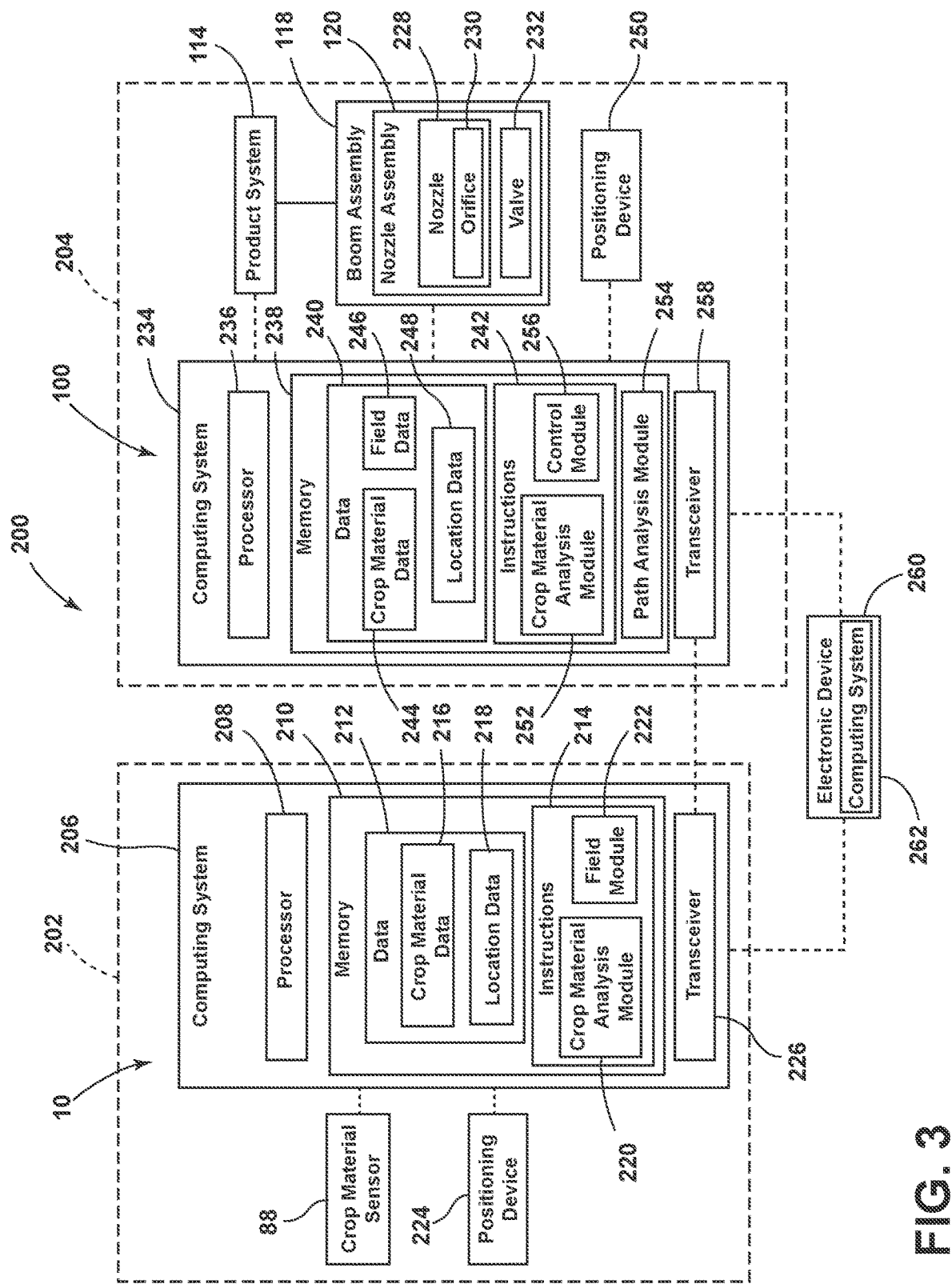
FIG. 3 illustrates a block diagram of components of a system for selectively applying an agricultural product in accordance with aspects of the present subject matter.
Figure 4:
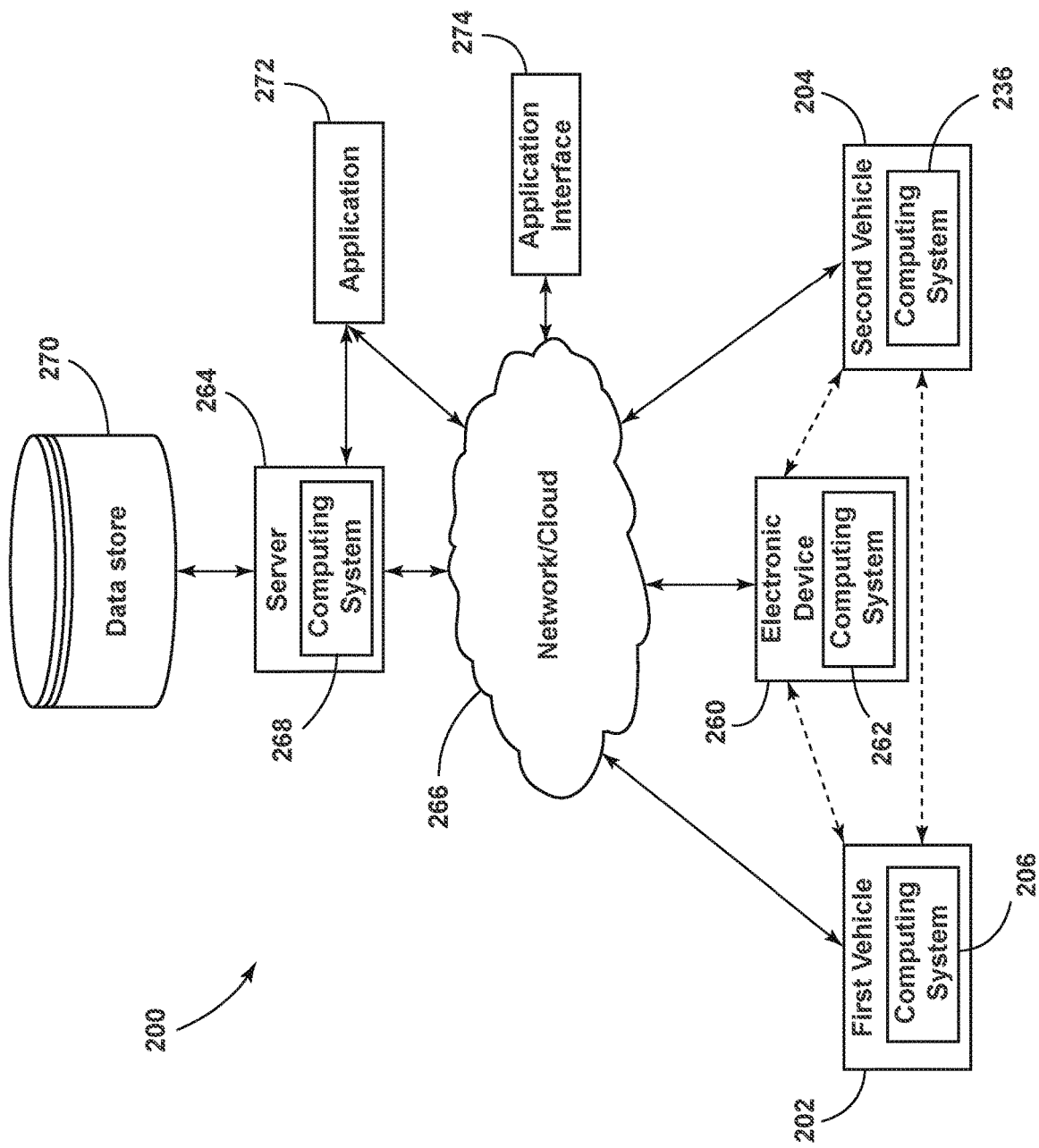
FIG. 4 is a block diagram illustrating a harvester and a sprayer operably coupled with a remote server in accordance with aspects of the present subject matter.

Referring to FIGS. 3 and 4, in several embodiments, a system 200 may include a first vehicle 202, such as the harvester 10 (FIG. 1), that may collect crop material data related to the crop material 16 within a field 14. The data may be analyzed for a subsequent spraying operation, which may be performed by a second vehicle 204, such as the sprayer 100 (FIG. 1).

Referring further to FIG. 3, a schematic view of a system 200 for operating various agricultural vehicles is illustrated in accordance with aspects of the present subject matter. In general, the system 200 will be described with reference to the harvester 10 of FIG. 1 and the sprayer 100 of FIG. 2. However, the disclosed system 200 may generally be utilized with agricultural vehicles having any other suitable vehicle configuration. For purposes of illustration, communicative links, or electrical couplings of the system 200 shown in FIG. 3 are indicated by dashed lines. The one or more communicative links or interfaces may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

In several embodiments, the first vehicle 202 can include a first computing system 106. In general, the first computing system 106 may comprise any suitable processor-based device, such as a computing device or any suitable combination of computing devices. Thus, in several embodiments, the first computing system 106 may include one or more processors 208 and associated memory 210 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 210 of the first computing system 106 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 210 may generally be configured to store information accessible to the processor 208, including data 212 that can be retrieved, manipulated, created, and/or stored by the processor 208 and instructions 214 that can be executed by the processor 208, when implemented by the processor 208, configure the first computing system 106 to perform various computer-implemented functions, such as one or more aspects of the image processing algorithms and/or related methods described herein. In addition, the first computing system 106 may also include various other suitable components, such as a communications circuit or module, one or more input/output channels, a data/control bus, and/or the like.

In several embodiments, the first computing system 106 may correspond to an existing controller of the harvester 10, or the first computing system 106 may correspond to a separate processing device. For instance, in some embodiments, the first computing system 106 may form all or part of a separate plug-in module or computing device that is installed relative to the harvester 10 to allow for the disclosed system 200 and method to be implemented without requiring additional software to be uploaded onto existing control devices of the harvester 10.

In several embodiments, the data 212 may be information received and/or generated by the first computing system 106 that is stored in one or more databases. For instance, as shown in FIG. 3, the memory 210 may include crop material data 216 received from the crop material sensor 88. For instance, the crop material sensor 88 may be configured to continuously, periodically, or otherwise capture crop material data 216 associated with the crop material 16. In such embodiments, the crop material data 216 transmitted to the computing system 106 from the crop material sensor 88 may be stored within the crop material database 216 for subsequent processing and/or analysis.

Additionally or alternatively, as shown in FIG. 3, the memory 210 may also include a location database 218, which may be configured to store location data 218 generated by a positioning device 224 that is received in conjunction with the crop material data 216 from the crop material sensor 88 and stored in association with such crop material data 216 for later use in geo-locating the crop material data 216 relative to the field 14. In some instances, the system 200 may store areas of the field 14 as distinct regions. In such instances, the system 200 may correlate the crop material data 216 to each geolocated regions. In several examples, the first computing system 106 may store a harvest volume of the harvest material 18 within one or more regions of the field 14 a non-harvest volume of the non-harvest material 20 within the one or more regions of the field 14.

In several embodiments, the instructions 214 stored within the memory 210 of the first computing system 106 may be executed by the processor 208 to implement a crop material analysis module 220. In general, the crop material analysis module 220 may be configured to assess the crop material data 216 and associated location data 218 to geo-locate the crop material data 216 within the field 14. As such, in various embodiments, as the harvester 10 travels across the field 14, the first computing system 106 may be configured to receive sensor data (e.g., image data) associated with crop material within the harvester 10 from the crop material sensor 88 (e.g., crop material-identifying sensors).

The first computing system 106 may be configured to analyze/process the crop material data 216 to detect/identify the type and location of crop material within the field 14. In this regard, the first computing system 106 may include any suitable image processing algorithms stored within its memory 210 or may otherwise use any suitable image processing techniques to determine, for example, the amount or volume of the harvest material 18 and/or an amount or volume of the non-harvest material 20 within the crop material 16 based on the received crop material data 216. For instance, the first computing system 106 may be configured to distinguish between various types of objects, such as harvest material 18, which may be a grain or other material to be harvested, and non-harvest material 20, which may be any material other than the material to be harvested. In some instances, the first computing system 106 may further determine one or more objects within the non-harvest material 20. For example, the first computing system 106 may classify whether objects within the non-harvest material 20 are weeds (e.g., any plant other than harvest material 18), dirt, rocks, stalk, straw, harvested crop from a previous season, etc.

The instructions 214 stored within the memory 210 of the first computing system 106 may further be executed by the processor 208 to implement a field module 222. The field module 222 may operate in conjunction with the crop material analysis module 220 and the location data 218 to generate one or more maps or any other type of information as field data 246. The field data 246 may be provided to the second vehicle 204 and/or any other remote location.

In some embodiments, the positioning device 224 may be configured as a satellite navigation positioning device (e.g. a GPS, a Galileo positioning system, a Global Navigation satellite system (GLONASS), a BeiDou Satellite Navigation and Positioning system, a dead reckoning device, and/or the like) to determine the location of the harvester 10.

Further, as shown in FIG. 3, the first computing system 106 may also include a transceiver 226 to allow for the first computing system 106 to communicate with any of the various other system components described herein. For instance, one or more communicative links or interfaces (e.g., one or more data buses) may be provided between the transceiver 226 and the crop material sensor 88 and/or the positioning device 224. Similarly, one or more communicative links or interfaces may be provided between the transceiver 226 and the second vehicle 204.

In several embodiments, the second vehicle 204 may additionally or alternatively be configured to receive the field data 246, the crop material data 216, and/or any other information from the first vehicle 202. In turn, the second vehicle 204 may utilize one or more nozzle assemblies 120 to selectively apply an agricultural product to the field 14. In some embodiments, the one or more nozzle assemblies 120 may be positioned along the boom assembly 118. The one or more nozzle assemblies 120 can include a valve 228 operably coupled with a nozzle 230 and configured to control a flow of agricultural product through the nozzle 230. The one or more nozzle assemblies 120 each define a respective orifice 232 that may dispense a fan pattern of the agricultural product. In various embodiments, the valve 228 may be configured as electronically controlled valves that are controlled by a Pulse Width Modulation (PWM) signal for altering the application rate of the agricultural product.

In several embodiments, the second vehicle 204 includes a second computing system 234. In general, the second computing system 234 may comprise any suitable processor-based device, such as a computing device or any suitable combination of computing devices. Thus, in several embodiments, the second computing system 234 may include one or more processors 236 and associated memory 238 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 238 of the second computing system 234 may generally comprise memory elements including, but not limited to, a computer-readable medium (e.g., random access memory (RAM)), a computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 238 may generally be configured to store information accessible to the processor 236, including data 240 that can be retrieved, manipulated, created, and/or stored by the processor 236 and instructions 242 that can be executed by the processor 236, when implemented by the processor 236, configure the second computing system 234 to perform various computer-implemented functions. In addition, the second computing system 234 may also include various other suitable components, such as a communications circuit or module, one or more input/output channels, a data/control bus, and/or the like.

In several embodiments, the second computing system 234 may correspond to an existing controller of the agricultural second vehicle 204, or the second computing system 234 may correspond to a separate processing device. For instance, in some embodiments, the second computing system 234 may form all or part of a separate plug-in module or computing device that is installed relative to the second vehicle 204 or boom assembly 118 to allow for the disclosed system 202 and method to be implemented without requiring additional software to be uploaded onto existing control devices of the second vehicle 204 or the boom assembly 118.

In several embodiments, the data 240 may be data received and/or generated by the first vehicle 202 that is stored in one or more databases. Additionally or alternatively, the data 240 may be data and/or information received and/or generated by the second computing system 234 that is stored in one or more databases. For instance, as shown in FIG. 3, the memory may include the crop material data 244 generated by the first vehicle 202 and/or any processed data 244 that may be generated from the crop material data 216 generated by the first vehicle 202.

The memory may also include location database 248, which may be configured to store data from a positioning system 250 associated with the second vehicle 204. In some embodiments, the positioning system 250 may be configured as a satellite navigation positioning device (e.g. a GPS, a Galileo positioning system, a Global Navigation satellite system (GLONASS), a BeiDou Satellite Navigation and Positioning system, a dead reckoning device, and/or the like) to determine the location of the second vehicle 204.

In several embodiments, the instructions 242 stored within the memory 238 of the second computing system 234 may be executed by the processor 236 to implement a crop material analysis module 252. In general, the crop material analysis module 220 may be configured to assess the crop material data 244 and associated location data 218 from the first vehicle 202 to generate field data 246. The field data 246 generated by the first computing system 206 may be similar and/or different from the field data 246 that may be generated by the second computing system 234.

In various embodiments, the instructions 242 stored within the memory 238 of the second computing system 234 may be executed by the processor 236 to implement a path analysis module 254. In general, the path analysis module 254 may be configured to receive the field data 246 from the crop material analysis module 252 and/or the field data 246 from the first computing system 206. In addition, the instructions 242 may receive location data 248 from a positioning system 250 of the second vehicle 204. In turn, the second computing system 234 may determine whether the second vehicle 204 is within a defined location of the field 14.

Referring still to FIG. 3, in some embodiments, the instructions 242 stored within the memory 238 of the second computing system 234 may also be executed by the processor 236 to implement a control module 256. In general, the control module 256 may be configured to electronically control the operation of one or more components of the agricultural second vehicle 204. For instance, the second vehicle 204 may be configured to selectively spray the agricultural product when the second vehicle 204 is within a defined region of the field 14. For example, when the second vehicle 204 is within a region portion of the field 14, the control module 256 may selectively dispense agricultural product onto the field 14 at a first flow rate. When the second vehicle 204 is within a second region of the field 14, the control module 256 may selectively dispense agricultural product onto the field 14 at a second flow rate, which may be varied from the first flow rate.

Further, as shown in FIG. 3, the second computing system 234 may also include a transceiver 258 to allow for the second computing system 234 to communicate with any of the various other system components described herein. For instance, one or more communicative links or interfaces (e.g., one or more data buses) may be provided between the transceiver 258 and the one or more nozzle assemblies 120 positioned along a boom assembly 118.

As illustrated, the transceiver 226 of the first computing system 206 and/or the transceiver 258 of the second computing system 234 may be operably coupled with a remote electronic device 260. The electronic device 260 may include a display for displaying information to a user. For instance, the electronic device 260 may display one or more user interfaces and may be capable of receiving remote user inputs. In addition, the electronic device 260 may provide feedback information, such as visual, audible, and tactile alerts, and/or allow the operator to alter or adjust one or more components of the harvester 10 through the usage of the remote electronic device 260. The electronic device 260 may include a variety of computing systems 262 including a processor and memory. For example, the electronic device 260 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

Referring to FIG. 4, in some examples, the first vehicle 202 (e.g., the harvester 10), the second vehicle 204 (e.g., the sprayer 100), and/or the electronic device 260 may be communicatively coupled with one another and/or one or more remote sites, such as a remote server 264 via a network/cloud 266 to provide data and/or other information therebetween. The network/cloud 266 represents one or more systems by which the first vehicle 202, the second vehicle 204, and/or the electronic device 260 may communicate with the remote server 264. The network/cloud 266 may be one or more of various wired or wireless communication mechanisms, including any desired combination of wired and/or wireless communication mechanisms and any desired network topology (or topologies when multiple communication mechanisms are utilized). Exemplary communication networks 266 include wireless communication networks (e.g., using Bluetooth, IEEE 802.11, etc.), local area networks (LAN) and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations when the precise location or interrelation of Internet resources are generally illustrated, extended networks such as the Internet are often depicted as a cloud (e.g. 266 in FIG. 4). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not the same, these terms are generally used interchangeably herein, and they may be referred to collectively as the network/cloud 266.

The server 264 may be one or more computer servers, each of which may include a computing system 268 including at least one processor and at least one memory, the memory storing instructions executable by the processor, including instructions for carrying out various steps and processes. The server 264 may include or be communicatively coupled to a data store 270 for storing collected data as well as instructions and/or data for the first vehicle 202, the second vehicle 204, and/or the electronic device 260 with or without intervention from a user, the first vehicle 202, the second vehicle 204, and/or the electronic device 260. Moreover, the server 264 may be capable of analyzing initial or raw sensor data received from the first vehicle 202, the second vehicle 204, and final or post-processing data (as well as any intermediate data created during data processing). Accordingly, the instructions and/or data provided to any one or more of the first vehicle 202, the second vehicle 204, and/or the electronic device 260 may be determined and generated by the server 264 and/or one or more cloud-based applications 272. In such instances, the user interface 250 of the first vehicle 202, the second vehicle 204, and/or the electronic device 260 may be a dummy device that provides various instructions and/or data based on instructions from the network/cloud 266.

With further reference to FIG. 4, the server 264 also generally implements features that may enable the first vehicle 202, the second vehicle 204, and/or the electronic device 260 to communicate with cloud-based applications 272. Communications from the electronic device 260 can be directed through the network/cloud 266 to the server 264 and/or cloud-based applications 272 with or without a networking device, such as a router and/or modem. Additionally, communications from the cloud-based applications 272, even though these communications may indicate one the first vehicle 202, the second vehicle 204, and/or the electronic device 260 as an intended recipient, can also be directed to the server 264. The cloud-based applications 272 are generally any appropriate services or applications 272 that are accessible through any part of the network/cloud 266 and may be capable of interacting with the electronic device 260.

In various examples, the first vehicle 202, the second vehicle 204, and/or the electronic device 260 can be feature-rich with respect to communication capabilities, i.e. have built-in capabilities to access the network/cloud 266 and any of the cloud-based applications 272 or can be loaded with, or programmed to have, such capabilities. The first vehicle 202, the second vehicle 204, and/or the electronic device 260 can also access any part of the network/cloud 266 through industry-standard wired or wireless access points, cell phone cells, or network nodes. In some examples, users can register to use the remote server 264 through the first vehicle 202, the second vehicle 204, and/or the electronic device 260, which may provide access to the first vehicle 202, the second vehicle 204, and/or the electronic device 260 and/or thereby allow the server 264 to communicate directly or indirectly with the first vehicle 202, the second vehicle 204, and/or the electronic device 260. In various instances, the first vehicle 202, the second vehicle 204, and/or the electronic device 260 may also communicate directly, or indirectly, with the first vehicle 202, the second vehicle 204, and/or the electronic device 260 or one of the cloud-based applications 272 in addition to communicating with or through the server 264. According to some examples, the first vehicle 202, the second vehicle 204, and/or the electronic device 260 can be preconfigured at the time of manufacture with a communication address (e.g. a URL, an IP address, etc.) for communicating with the server 264 and may or may not have the ability to upgrade or change or add to the preconfigured communication address.

Referring still to FIG. 4, when a new cloud-based application 272 is developed and introduced, the server 264 can be upgraded to be able to receive communications for the new cloud-based application 272 and to translate communications between the new protocol and the protocol used by the first vehicle 202, the second vehicle 204, and/or the electronic device 260. The flexibility, scalability, and upgradeability of current server technology render the task of adding new cloud-based application protocols to the server 264 relatively quick and easy.

In several embodiments, an application interface 274 may be operably coupled with the cloud 266 and/or the application 272. The application interface 274 may be configured to receive data related to the first vehicle 202, the second vehicle 204, and/or the electronic device 260. In various embodiments, one or more inputs related to the field data 246 (FIG. 3) may be provided to the application interface 274. For example, a farmer, a vehicle user, a company, or other persons may access the application interface 274 to enter the inputs related to the field data 246. Additionally or alternatively, the inputs related to the field data 246 may be received from a remote server 264. For example, the inputs related to the field data 246 may be received in the form of software that can include one or more objects, agents, lines of code, threads, subroutines, databases, application programming interfaces (APIs), or other suitable data structures, source code (human-readable), object code (vehicle-readable). In response, the system 200 may update any input/output based on the received inputs. The application interface 274 can be implemented in hardware, software, or a suitable combination of hardware and software, and which can be one or more software systems operating on a general-purpose processor platform, a digital signal processor platform, or other suitable processors.

In some examples, at various predefined periods and/or times, the first vehicle 202, the second vehicle 204, and/or the electronic device 260 may communicate with the server 264 through the network/cloud 266 to obtain the stored instructions and/or data, if any exist. Upon receiving the stored instructions and/or data, the first vehicle 202, the second vehicle 204, and/or the electronic device 260 may implement the instructions and/or data. In some instances, the first vehicle 202, the second vehicle 204, and/or the electronic device 260 can send event-related data to the server 264 for storage in the data store 270. This collection of event-related data can be accessed by any number of users, the first vehicle 202, the second vehicle 204, and/or the electronic device 260 to assist with application processes.

In various embodiments, the data used by the first vehicle 202, the second vehicle 204, the electronic device 260, the remote server 264, the data store 270, the application 272, the application interface 274, and/or any other component described herein for any purpose may be based on data provided by the one or more crop material sensors 88 and/or the positioning device 224 operably coupled with the first vehicle 202, the positioning system 250 operably coupled with the second vehicle 204, and/or third-party data that may be converted into comparable data that may be used independently or in conjunction with data collected from the one or more crop material sensors 88.

In various embodiments, based on the data collected during the first operation, the system 200 may be configured to generate a harvest material yield map 280, a predicted weed concentration map 282, a prescription map 284 that generally illustrates one or more regions for which an agricultural product is to be applied, and/or any other information. The system 200 may include the first computing system 106 associated with the first vehicle 202, the second computing system 234 associated with the second vehicle 204, the computing system 262 of the electronic device 260, a computing system 268 of the remote server 264, a computing system associated with the data store 270, a computing system associated with the application 272, and/or a computing system associated with the application interface 274. As such, in various embodiments, the information that may be produced by a computing system is remote from the first vehicle 202 and/or the second vehicle 204.

In various examples, the server 264 may implement machine learning engine methods and algorithms that utilize one or several machine learning techniques including, for example, decision tree learning, including, for example, random forest or conditional inference trees methods, neural networks, support vector vehicles, clustering, and Bayesian networks. These algorithms can include computer-executable code that can be retrieved by the server 264 through the network/cloud 266 and may be used to generate a predictive evaluation of the field 14. In some instances, the machine learning engine may allow for changes to a harvest yield map 280, a projected weed concentration map 282, and/or a prescription map 284 to be performed without human intervention.

Figure 9:
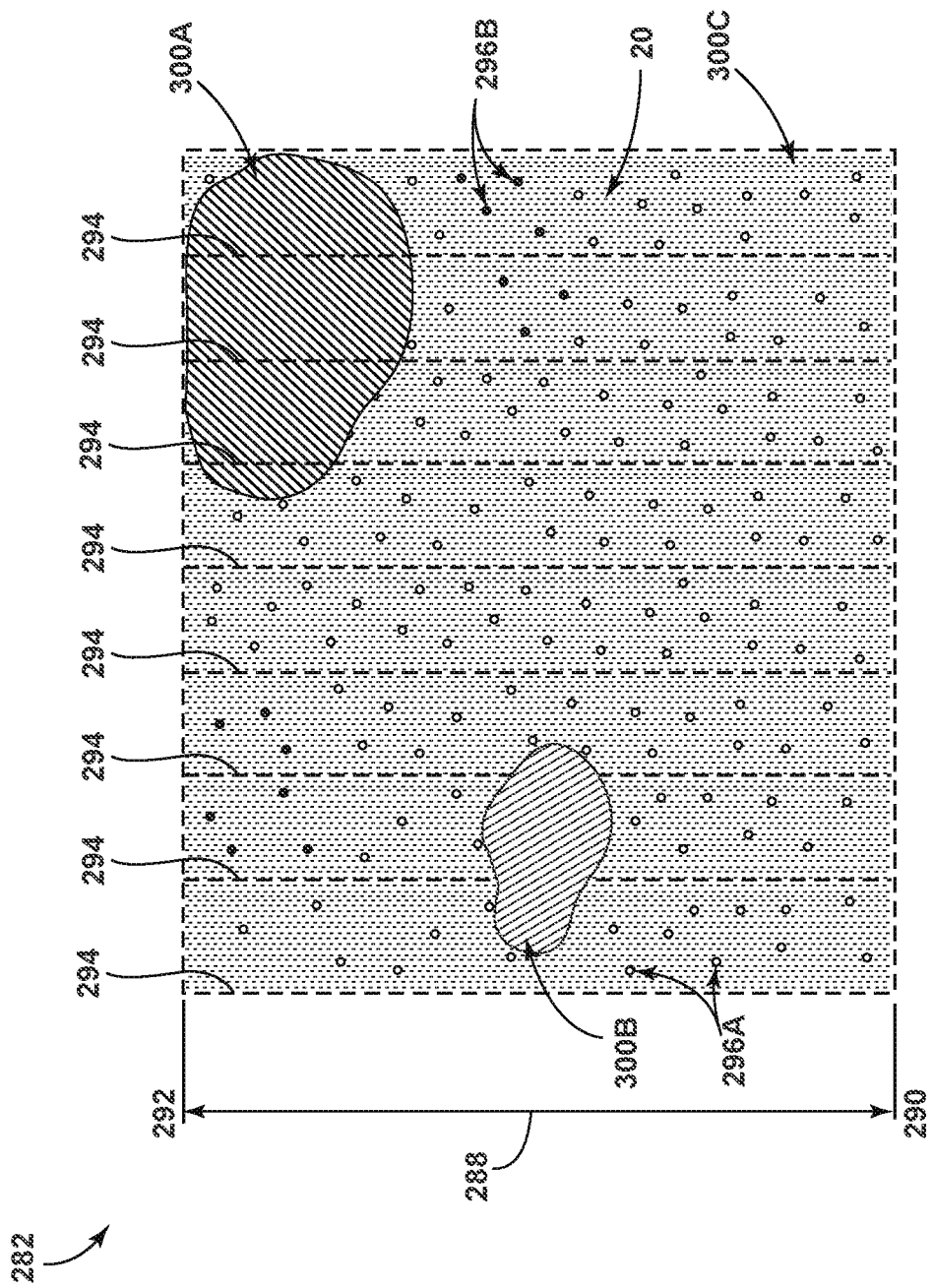
FIG. 9 illustrates a projected weed concentration map in accordance with aspects of the present subject matter.
Figure 10:
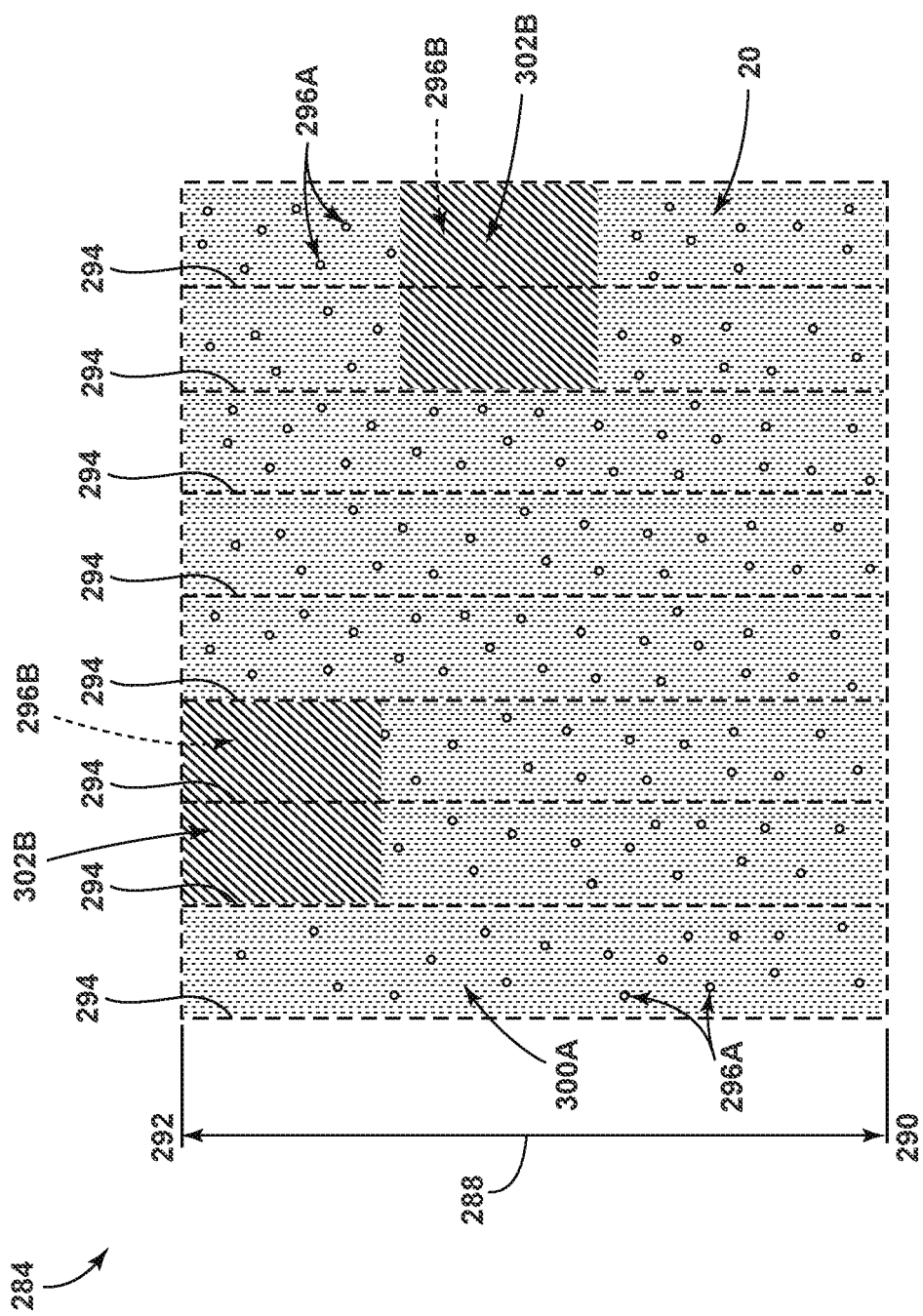
FIG. 10 illustrates a prescription map in accordance with aspects of the present subject matter.
Figure 11:
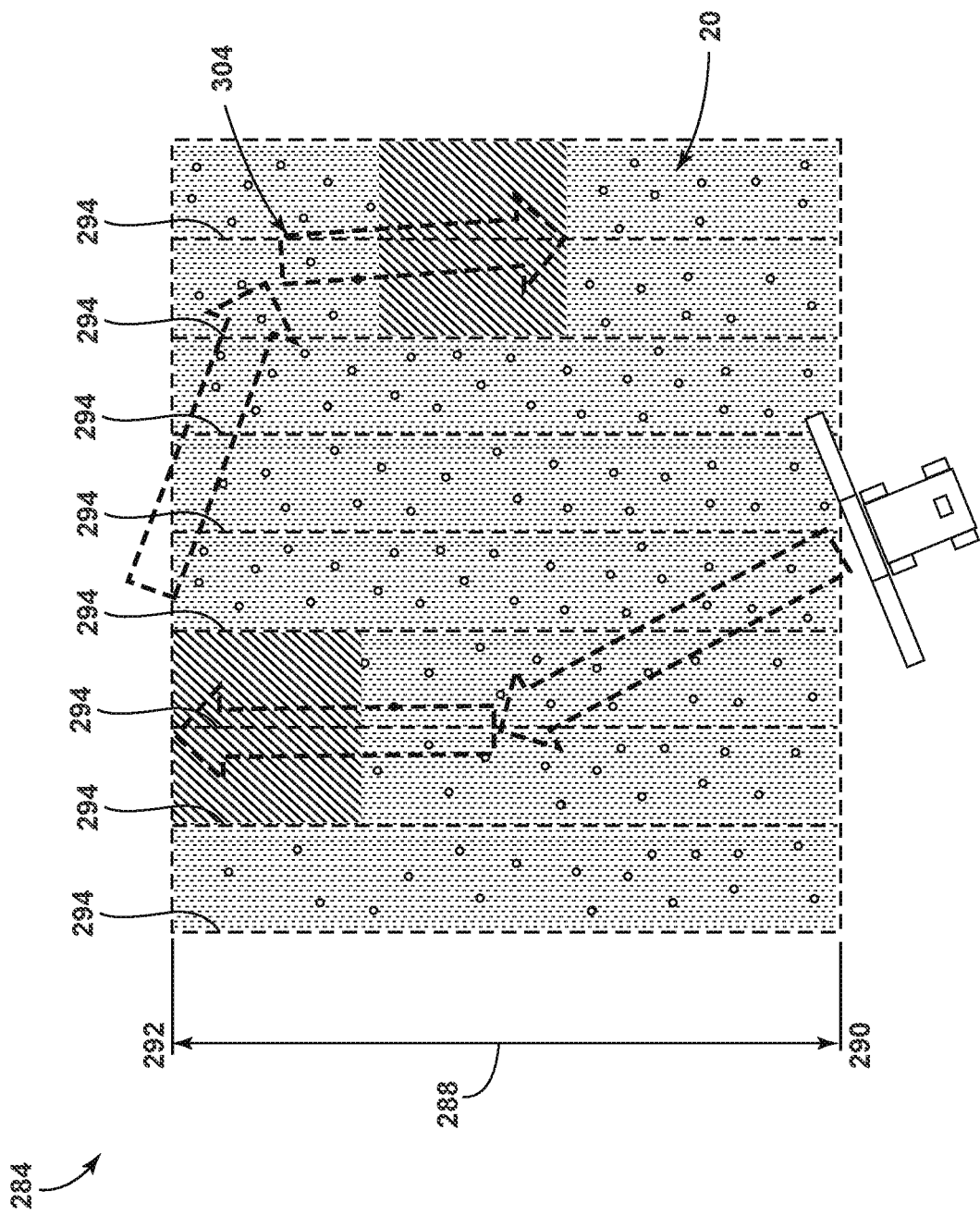
FIG. 11 illustrates the prescription map of FIG. 10 including a first suggested application path in accordance with aspects of the present subject matter.
Figure 12:
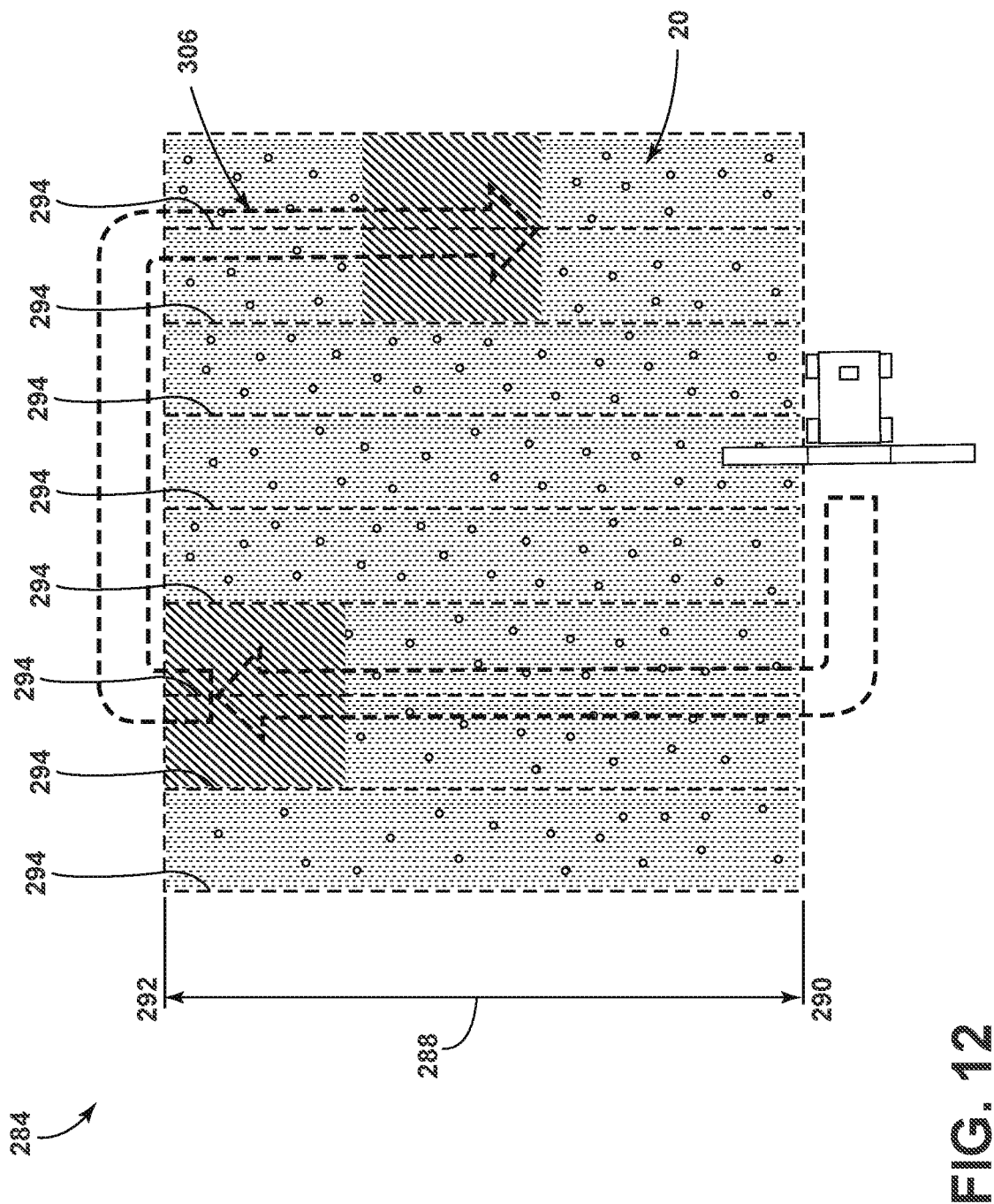
FIG. 12 illustrates the prescription map of FIG. 10 including a second suggested application path in accordance with aspects of the present subject matter.

With respect to FIGS. 5-12, various example embodiments of the system 200 during various operations are illustrated according to the present subject matter will be described below. Particularly, FIGS. 5-7 generally illustrate a first vehicle 202 performing a first agricultural operation in a working area 286 of a field 14 in accordance with various examples of the present disclosure. Additionally, FIG. 8 generally illustrates an exemplary harvest yield map 280 in accordance with various examples of the present disclosure. FIG. 9 generally illustrates an exemplary projected weed concentration map 282 in accordance with various examples of the present disclosure. FIG. 10 generally illustrates an exemplary prescription map 284 in accordance with various examples of the present disclosure. FIGS. 11 and 12 generally illustrate projected paths for a second vehicle 204 to selectively apply an agricultural product to one or more regions of a field 14 detected by the first vehicle 202 in accordance with various examples of the present disclosure.

Figure 5:
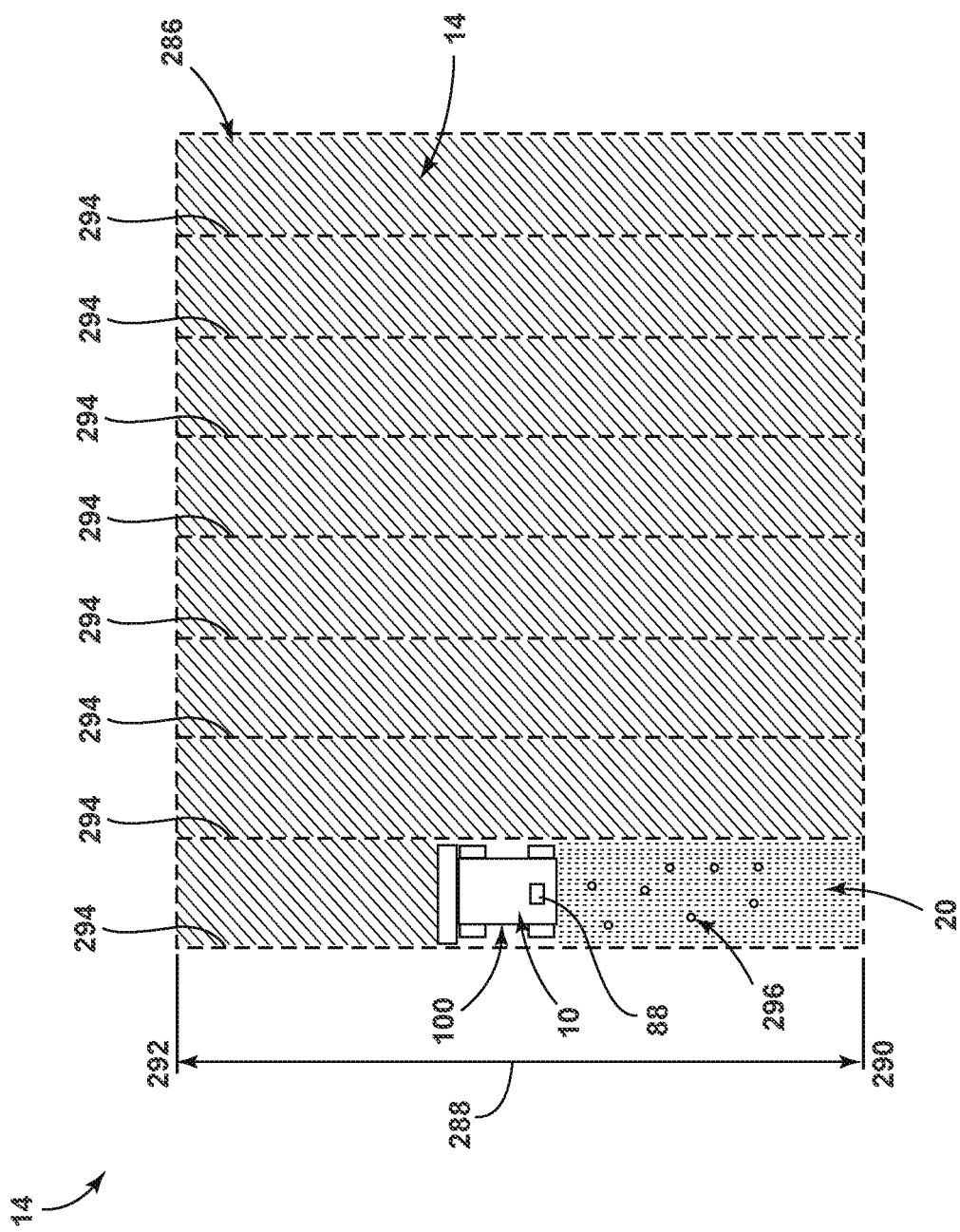
FIG. 5 is a schematic illustration of the harvester performing a first pass within an agricultural field in accordance with aspects of the present subject matter.
Figure 6:
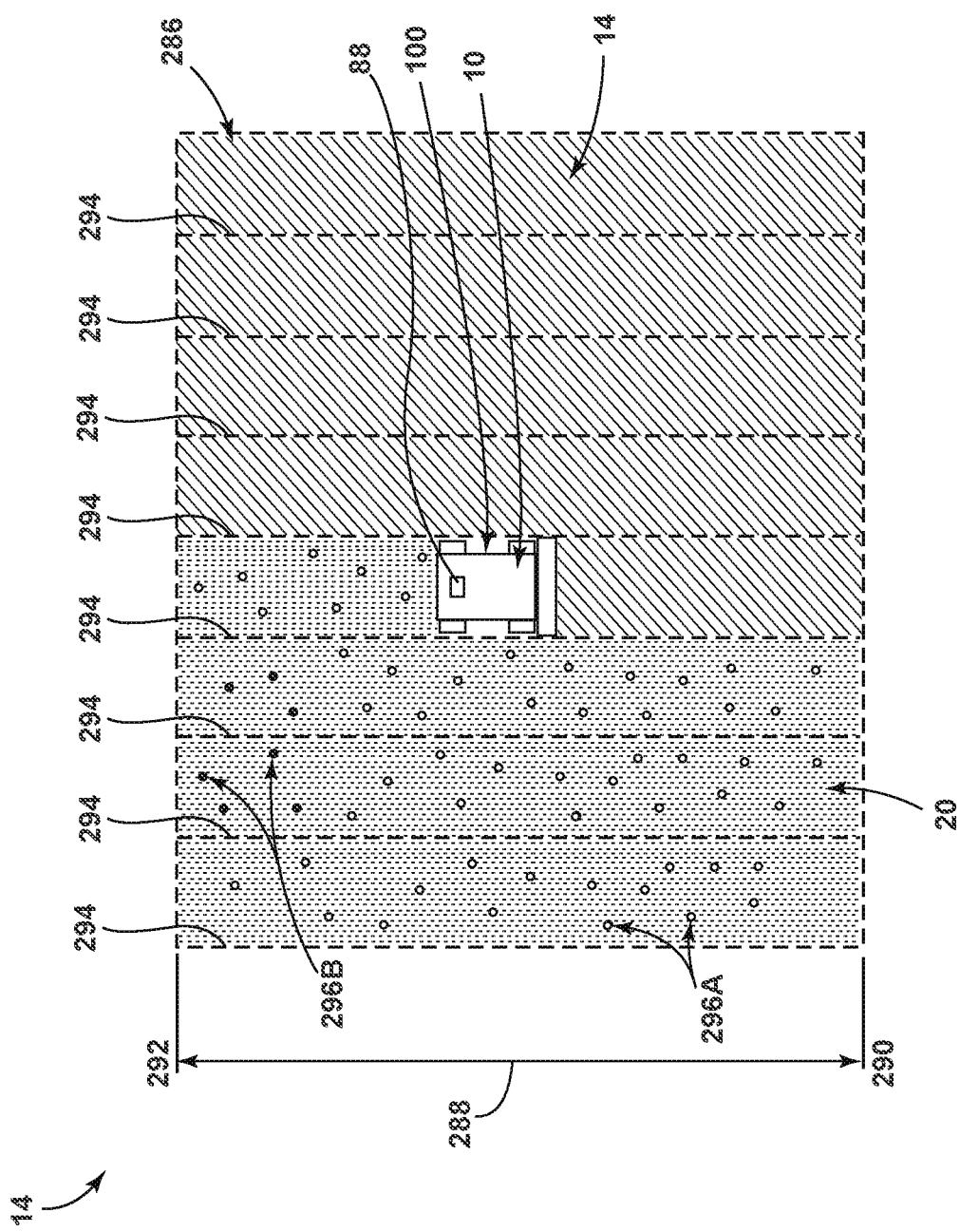
FIG. 6 is a schematic illustration of the harvester performing a second pass within an agricultural field in accordance with aspects of the present subject matter.
Figure 7:
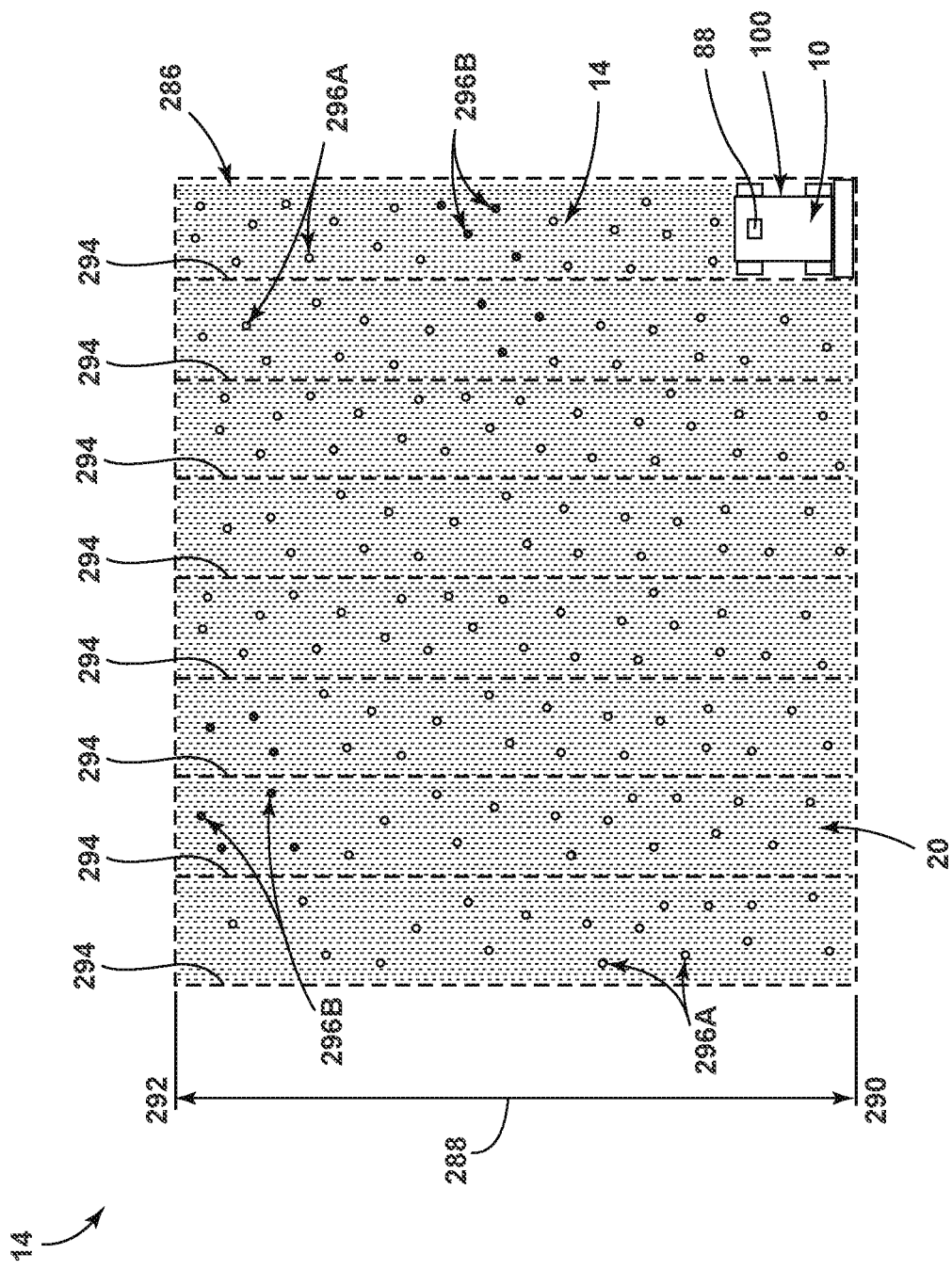
FIG. 7 is a schematic illustration of the harvester performing a third pass within an agricultural field in accordance with aspects of the present subject matter.

Referring further to FIGS. 5-7, the working area 286 of the field 14 extends in an operating direction 288 between a first end portion 290 and a second end portion 292. In addition, a plurality of swath lines 294 may extend in the operating direction 288 between the first and second end portions 406, 408 of the working area 286. In general, the swath lines 294 may correspond to predetermined or pre-generated guidance lines representing anticipated or desired paths or passes across the field 14 for performing a first agricultural operation (e.g., a planting operation, a seeding operation, a tilling operation, a harvesting operation, a spraying operation, and/or any other operation). While the embodiments of FIGS. 5-7 generally illustrate and describe the first vehicle 202 being configured as a harvester 10, it will be appreciated that the first vehicle 202 may be configured as tractor, harvester 10, self-propelled windrower, self-propelled sprayer, drone, and/or the like. In addition, it will be appreciated that the first vehicle 202 may be human-controlled, autonomously controlled, and/or semi-autonomously controlled without departing the scope of the present disclosure.

With further reference to FIGS. 5-7, while the first operation is performed by moving the first vehicle 202 through each swath line 294, the one or more crop material sensors 88 may monitor the crop material 16 as the crops 12 are severed by the first vehicle 202. Data captured by the one or more crop material sensors 88 may be provided to the first computing system 106 (FIG. 3). Additionally, a positioning device 224 may be configured to provide data to the first computing system 106 related to a position of the first vehicle 202, which may be correlated to the crop material data 244 generated by the one or more crop material sensors 88. In some embodiments, the crop material data 244 and the location data may be utilized by the first computing system 106 to generate field data 246.

The field data 246 may include defined objects within the crop material data 244. For example, the system 200 may determine whether an object is harvest material 18 or non-harvest material 20. In addition, the system 200 may be configured to determine a concentration or ratio of harvest material 18 and/or non-harvest material 20 within the field 14. Still further, the system 200 may determine various objects within the non-harvest material 20, which may include weeds 296A, 296B including a previous harvest season crop that is different than a current crop, etc.

In some instances, the system 200 may store areas of the field 14 as distinct regions. In such instances, the system 200 may geolocate various data to each region based on data from the positioning device 224. For example, the stored field data may include a harvest volume of the harvest material 18 within one or more regions of the field 14 and/or a non-harvest volume of the non-harvest material 20 within the one or more regions of the field 14.

Figure 8:
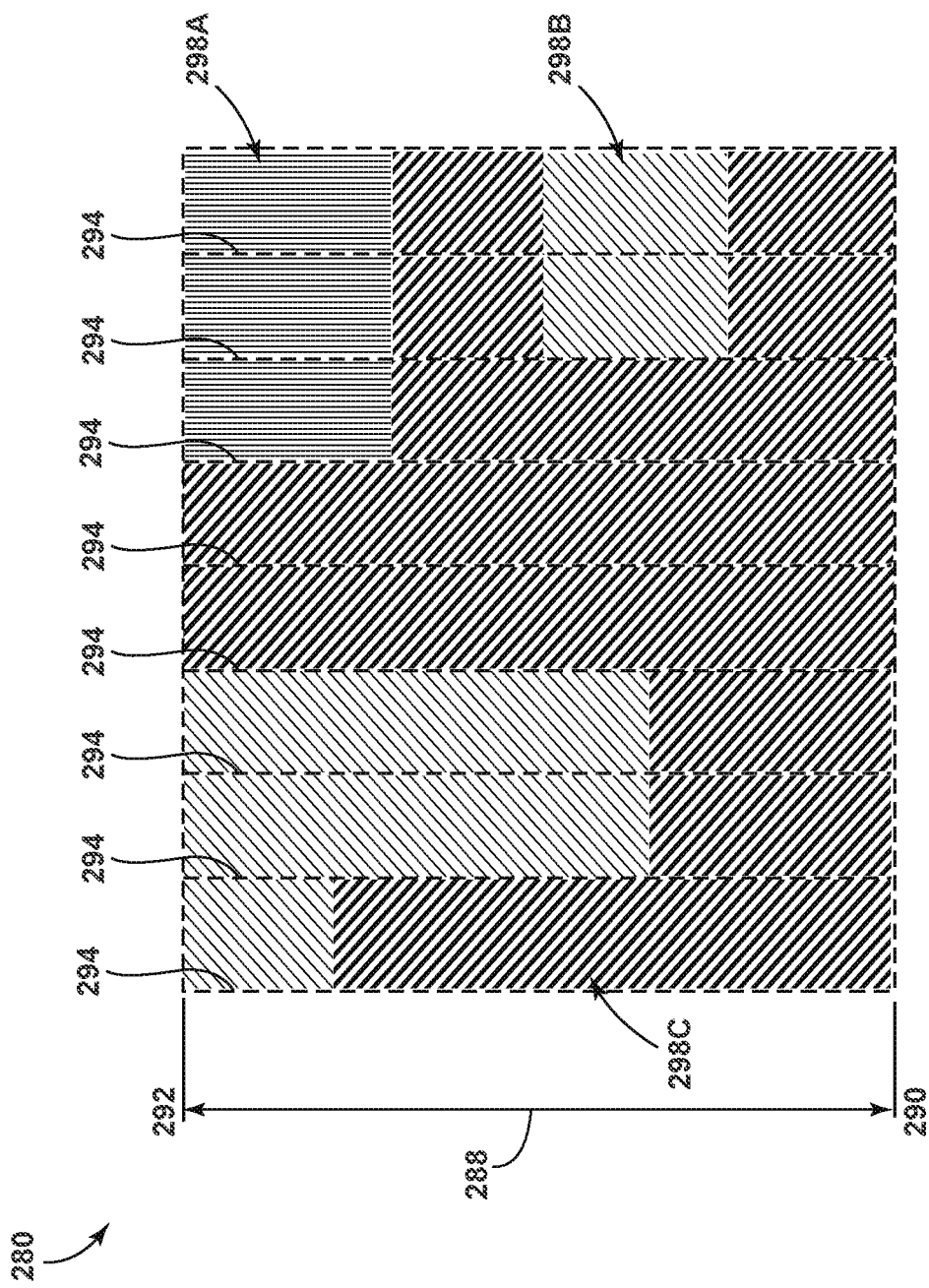
FIG. 8 illustrates a harvest material yield map in accordance with aspects of the present subject matter.

Referring to FIG. 8, based on the field data 246 of the first vehicle 202, and the location data 218 of the first vehicle 202, the system 200 may generate a harvest yield map 280, which generally illustrates harvest material 18 outputs for each of the one or more regions within the field 14. For example, the yield map 280 may illustrate regions 298A, 298B 298C of the field 14 that produced greater than a defined range of harvest material 18, the defined range of harvest material 18, and/or less than the defined range of harvest material 18. Based on the various regions, the system 200 may project that regions 298A that produced greater than the defined range of harvest material 18 may also have a higher concentration of weeds 296A, 296B as well. As such, a volume of the agricultural product above a defined volume or application rate may be applied to the regions 298A having the higher concentration of weeds 296A, 296B. Likewise, the system 200 may project that regions 298B that produced less than the defined range of harvest material 18 may also have a lesser concentration of weeds 296A, 296B as well. As such, an amount of the agricultural product less than a defined volume or application rate may be applied to the regions 298B having the lesser concentration of weeds 296A, 296B. Further, the system 200 may project that regions 298C that produced the defined range of harvest material 18 may also have an average concentration of weeds 296A, 296B as well. As such, an amount of the agricultural product at the defined volume or application rate may be applied to the regions 298C having the lesser concentration of weeds 296A, 296B.

Referring to FIG. 9, the system 200 may additionally or alternatively generate a weed concentration map 282 based on the field data 246 of the first vehicle 202, and the location data 218 of the first vehicle 202. The weed concentration map 282 may illustrate regions 300A, 300B, 300C of the field 14 that have a varied concentration and/or a number of weeds 296A, 296B from a defined range, which may be determined through the crop material sensors 88 detecting various objects within the crop material 16 and/or the non-harvest material 20 during the first operation. For instance, a first region 300A may have a higher concentration of weeds 296A, 296B from the defined range, a second region 300B may have a lower concentration of weeds 296A, 296B from the defined range, and remaining regions 300C may have a concentration of weeds 296A, 296B within the defined range.

The projected weed concentration map 282 may be used by the second vehicle 204 to apply various quantities of agricultural product to defined regions of the field 14. Additionally or alternatively, based on the harvest material 18 and/or non-harvest material 20 outputted from the harvester 10, the first computing system 206 may provide a sprayer operator with a suggested product to apply to the field 14.

The projected weed concentration map 282 may be used by the second vehicle 204 to apply various volumes or application rates of agricultural product to defined portions of the field 14. For example, if a region 300A of the field 14 contains a higher projected concentration of weeds 296A, 296B than a defined concentration range, a greater volume or application rate of the agricultural product or a different agricultural product may be applied to the higher projected concentration regions 300A. Further, if a region 300B of the field 14 contains a lower projected concentration of weeds 296A, 296B than the defined concentration range, a lesser volume or application rate of the agricultural product or a different agricultural product may be applied to the higher projected concentration regions 300B.

Referring to FIGS. 10-12, the system 200 may additionally or alternatively generate a prescription map 284 that illustrates various regions 302A, 302B of the field 14 that may have one or more agricultural products applied thereto based on the field data 246 of the first vehicle 202, and the location data 218 of the first vehicle 202. For example, the prescription map 284 may include a first region 302A that is indicative of an area for which a first weed type 296A that is to have a first agricultural product applied thereto and/or a second region 302B that is indicative of an area for which a second weed type 296B that is to have a second agricultural product applied thereto by the second vehicle 204. In various instances, the first agricultural product may be applied at a first application rate while the second agricultural product may be applied at a second application rate.

In various examples, the system 200 may further generate one or more suggested paths 304, 306 for the second vehicle 204 to apply an agricultural product to the first regions 302A and/or the second regions 302B of the field 14. The paths 304, 306 may be generated based on one or more user defined settings and/or field characteristics. The user defined settings may include any factor of a spray operation that may be altered by the user while the field characteristics may include one or more features of the field 14. For example, the features may include whether the crop material 16 is in a pre-emergence stage or a post emergence stage. In such instances, as illustrated in FIG. 11, a first path 304 may be generated to the second regions 320B of the field 14 in which the sprayer 100 travels a first distance and may be utilized when the crop material 16 is in a pre-emergence stage. Additionally or alternatively, as illustrated in FIG. 12, a second path 306 may be generated to the second regions 302B of the field 14 in which the sprayer 100 travels a second distance and may be utilized when the crop material 16 is in a post-emergence stage. In some instances, the second distance may be less than the first distance.

Figure 13:
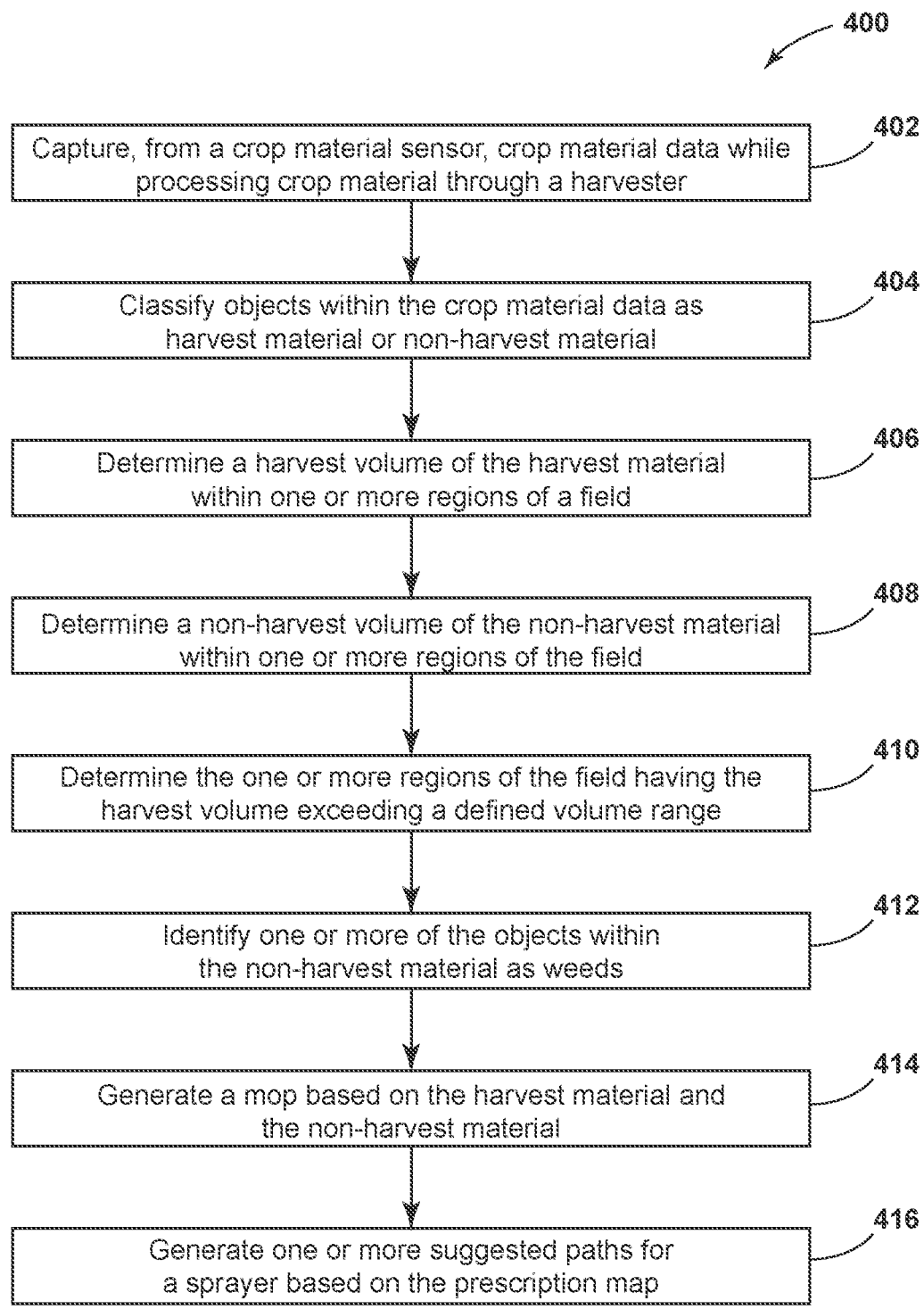
FIG. 13 illustrates a flow diagram of a method of selectively applying an agricultural product in accordance with aspects of the present subject matter.

Referring now to FIG. 13, a flow diagram of some embodiments of a method 400 for selectively applying an agricultural product is illustrated in accordance with aspects of the present subject matter. In general, the method 400 will be described herein with reference to the system 200 described herein. However, it will be appreciated by those of ordinary skill in the art that the disclosed method 400 may generally be utilized with any suitable agricultural sprayer 100 and/or may be utilized in connection with a system having any other suitable system configuration. In addition, although FIG. 13 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 13, at (402), the method 400 can include capturing crop material data while processing crop material through a harvester from a crop material sensor. In general, the harvester is configured to sever crops from a field and direct the crop material into the harvester. Within the harvester, the crop material may be separated into harvest material (e.g., grain) and non-harvest material (e.g., material other than grain (MOG), straw, previous harvest season crop, etc.). The harvester may further include one or more crop material sensors that may be configured to capture data indicative of a makeup of the crop material.

At (404), the method 400 can include classifying objects within the crop material data as harvest material or non-harvest material. In some instances, the crop material sensor can be configured to capture image data and/or image-like data. In such instances, the system provided herein can utilize one or more image processing algorithms to classify the objects within the crop material data as the harvest material or the non-harvest material.

At (406), the method 400 can include determining a harvest volume of the harvest material within one or more regions of a field based on the data provided from the one or more crop material sensors. Additionally or alternatively, at (408), the method 400 can include determining a non-harvest volume of the non-harvest material within the one or more regions of the field. As provided herein, in some instances, the system may store areas of the field as distinct regions. In such instances, the system may correlate various data to each region. In addition, each region may be geolocated based on data from the positioning device.

At (410), the method 400 can include determining the one or more regions of the field having the harvest volume exceeding a defined range. For example, regions of the field that produced greater than a defined range of harvest material, the defined range of harvest material, and/or less than the defined range of harvest material. Based on the various regions, the system may project that regions that produced greater than the defined range of harvest material may also have a higher concentration of weeds as well. As such, a volume of the agricultural product above a defined volume or application rate may be applied to the regions having the higher concentration of weeds. Likewise, the system may project that regions that produced less than the defined range of harvest material may also have a lesser concentration of weeds as well. As such, an amount of the agricultural product less than a defined volume or application rate may be applied to the regions having the lesser concentration of weeds. Further, the system may project that regions that produced the defined range of harvest material may also have an average concentration of weeds as well. As such, an amount of the agricultural product at the defined volume or application rate may be applied to the regions having the lesser concentration of weeds.

At (412), the method 400 can include identifying one or more of the objects within the non-harvest material as weeds. For example, the system may classify whether objects within the non-harvest material are weeds (e.g., any plant other than harvest material), dirt, rocks, stalk, straw, harvested crop from a previous season, etc.

At (414), the method 400 can include generating a map based on the detected harvest material and the non-harvest material. As provided herein, the map may be at least one of a harvest material yield map, a projected weed concentration map, or a prescription map.

At (416), the method 400 can include generating one or more suggested paths for a sprayer based on the prescription map to apply an agricultural product to a first region and/or a second region of the field. The one or more suggested paths may be generated based on one or more user defined settings and/or field characteristics. The user defined settings may include any factor of a spray operation that may be altered by the user while the field characteristics may include one or more features of the field. For example, the features may include whether the cop material is in a pre-emergence stage or a post emergence stage. For instance, a first path may be generated to the second regions of the field in which the sprayer travels a first distance and may be utilized when the crop material is in a pre-emergence stage. Additionally or alternatively, a second path may be generated to the second regions of the field in which the sprayer travels a second distance and may be utilized when the crop material is in a post-emergence stage. In some instances, the second distance may be varied from the first distance.

In various examples, the method may implement machine learning methods and algorithms that utilize one or several machine learning techniques including, for example, decision tree learning, including, for example, random forest or conditional inference trees methods, neural networks, support vector vehicles, clustering, and Bayesian networks. These algorithms can include computer-executable code that can be retrieved by the computing system and/or through a network/cloud and may be used to evaluate and update the boom deflection model. In some instances, the machine learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural operation, the system comprising:
    a sprayer configured to selectively apply an agricultural product, the sprayer configured to communicatively couple with a harvester configured to separate crop material into a harvest material and a non-harvest material, the harvester including a crop material sensor operably coupled with the harvester and configured to capture crop material data; and a positioning device configured to generate location data to geolocate the crop material data relative to a field;
    a nozzle assembly operably coupled with the sprayer; and
    a computing system communicatively coupled with the crop material sensor and the positioning device, the computing system configured to:
        classify objects within the crop material data as the harvest material or the non-harvest material;

generate a map based on the harvest material and the non-harvest material;

generate one or more suggested paths based on the crop material within the field being in a pre-emergence state or post-emergence state; and selectively apply the agricultural product from the nozzle assembly along the one or more suggested paths.

2. The system of claim 1, wherein the sprayer includes a boom assembly supporting the nozzle assembly.

3. The system of claim 2, wherein the computing system is remote from the harvester and the sprayer.

4. The system of claim 2, wherein the harvester and the sprayer are communicatively coupled through a communication network/cloud.

5. The system of claim 1, wherein the computing system is further configured to:

store a harvest volume of the harvest material within one or more regions of the field; and store a non-harvest volume of the non-harvest material within the one or more regions of the field.

6. The system of claim 5, wherein the map is a harvest material yield map, the harvest material yield map configured to illustrate a yield of the harvest material from each of the one or more regions within the field.

7. The system of claim 1, wherein the crop material sensor is configured to capture image data, and wherein the computing system utilizes one or more image processing algorithms to classify the objects within the crop material data as the harvest material or the non-harvest material.

8. The system of claim 1, wherein the computing system is further configured to:

identify one or more of the objects within the non-harvest material as weeds, wherein the map is a projected weed concentration map based on the weeds, the projected weed concentration map configured to illustrate a location of the weeds within the field.

9. The system of claim 8, wherein the computing system is further configured to:

classify the weeds as a first set of weeds or a second set of weeds; and generate a prescription map based on the first set of weeds and the second set of weeds, wherein the prescription map includes a first region associated with the first set of weeds and a second region associated with the second set of weeds.

10. The system of claim 9, wherein the computing system is further configured to generate a first suggested path for the sprayer to the second region when the crop material within the field are in the pre-emergence state and a second suggested path for the sprayer to the second region when the crop material within the field are in the post-emergence state.

11. A method for operating an agricultural system, the method comprising:

capturing, from a crop material sensor, crop material data while processing crop material through a harvester;

classifying objects within the crop material data as harvest material or non-harvest material;

generating a map based on the harvest material and the non-harvest material;

generating a first suggested path for a second vehicle based on the crop material being in a pre-emergence state and a second suggested path based on the crop material being in a post-emergence state; and selectively applying an agricultural product along the first suggested path or the second suggested path through a sprayer.

12. The method of claim 11, wherein the method further comprises:

determining a harvest volume of the harvest material within one or more regions of a field; and determining a non-harvest volume of the non-harvest material within the one or more regions of the field.

13. The method of claim 12, further comprising:

determining the one or more regions of the field having the harvest volume exceeding a defined range.

14. The method of claim 11, further comprising:

identifying one or more of the objects within the non-harvest material as weeds.

15. The method of claim 11, wherein the map is at least one of a harvest material yield map, a projected weed concentration map, or a prescription map.

16. An agricultural system comprising:

a harvester configured to separate crop material into a harvest material and a non-harvest material including a crop material sensor configured to capture crop material data of the crop material;

a computing system communicatively coupled with the crop material sensor, the computing system configured to:

classify objects within the crop material data as harvest material or non-harvest material; and generate one or more suggested paths based on the crop material within a field being in a pre-emergence state or post-emergence state; and a sprayer communicatively coupled with the harvester and configured to selectively apply an agricultural product to the field along the one or more suggested paths.

17. The system of claim 16, further comprising:

a positioning device configured to generate location data to geolocate the crop material data relative to the field.

18. The system of claim 17, further comprising:

a computing system communicatively coupled with the crop material sensor and the positioning device, the computing system configured to:

generate a map based on the harvest material.

19. The system of claim 17, further comprising:

a computing system communicatively coupled with the crop material sensor and the positioning device, the computing system configured to:

generate a map based on the non-harvest material.

* * * * *